United States Patent
Torno et al.

(10) Patent No.: US 9,234,549 B2
(45) Date of Patent: Jan. 12, 2016

(54) TORSIONAL COUPLING FOR A MOBILE ATTACHMENT DEVICE

(71) Applicant: Paladin Brands Group, Inc., Oak Brook, IL (US)

(72) Inventors: Randall Torno, Ann Arbor, MI (US); Matt Malenfant, Westland, MI (US); Nathan Kellaway, Fenton, MI (US)

(73) Assignee: Paladin Brands Group, Inc., Oakbrook, IL (US)

( * ) Notice: Subject to any disclaimer, the term of this patent is extended or adjusted under 35 U.S.C. 154(b) by 0 days.

(21) Appl. No.: 14/026,380

(22) Filed: Sep. 13, 2013

(65) Prior Publication Data

US 2015/0080135 A1 Mar. 19, 2015

(51) Int. Cl.
*F16F 15/123* (2006.01)
*F16D 3/12* (2006.01)
*F16D 3/66* (2006.01)
*A01D 34/62* (2006.01)

(52) U.S. Cl.
CPC *F16D 3/12* (2013.01); *A01D 34/62* (2013.01); *F16D 3/66* (2013.01); *F16F 15/123* (2013.01)

(58) Field of Classification Search
CPC ............. A01D 34/62; F16D 3/12; F16D 3/66; F16F 15/123

USPC ............................. 464/66.1, 68.1, 68.9, 68.91
See application file for complete search history.

(56) References Cited

U.S. PATENT DOCUMENTS

| | | | |
|---|---|---|---|
| 4,553,855 A | 11/1985 | DeChoudhury | |
| 4,796,728 A * | 1/1989 | Kanengieter et al. | 464/68.41 |
| 5,163,875 A | 11/1992 | Takeuchi | |
| 5,505,288 A | 4/1996 | Tomiyama | |
| 5,771,744 A * | 6/1998 | Canova et al. | 464/61.1 |
| 6,113,496 A | 9/2000 | Oyama | |
| 6,131,487 A * | 10/2000 | Jackel et al. | 464/64.1 |
| 6,135,889 A * | 10/2000 | Salviato | 464/66.1 |
| 6,622,842 B2 * | 9/2003 | Diemer et al. | 464/68.41 |
| 6,837,345 B1 | 1/2005 | Lauble | |
| 7,343,832 B2 * | 3/2008 | Jaeckel et al. | 74/573.12 |
| 7,481,132 B2 * | 1/2009 | Mende et al. | 74/574.3 |
| 7,930,872 B2 | 4/2011 | Trevillyan | |
| 8,096,886 B2 | 1/2012 | Kirschey | |
| 2005/0070362 A1 | 3/2005 | Mende | |
| 2010/0133060 A1 * | 6/2010 | Boelling | 192/30 V |
| 2012/0004043 A1 | 1/2012 | Lehmann | |
| 2012/0298474 A1 | 11/2012 | Ward | |

* cited by examiner

*Primary Examiner* — Josh Skroupa
(74) *Attorney, Agent, or Firm* — Nyemaster Goode, P.C.

(57) ABSTRACT

A drive assembly for a mobile attached device. The assembly comprises a hydraulic motor, a torsional coupling, and a mobile attachment device having a housing and plurality of teeth combined with a rotor shaft. The torsional coupling is combined with the assembly between the hydraulic motor and the mobile attachment device.

13 Claims, 9 Drawing Sheets

TORSIONAL COUPLING FOR A MOBILE ATTACHMENT DEVICE

BACKGROUND

The invention generally relates to a mobile attachment device. More particularly, the invention relates to a drive assembly for a mobile attachment device wherein the drive assembly comprises a torsional coupling to minimize unwanted torsion impact from being transmitted between the mobile attachment device and the motor.

Land clearing and mobile construction devices are used in a wide range of industries for many different purposes. Examples of land clearing devices include mowers, soil conditioners, wood chippers, stump grinders, and brush cutters. Examples of mobile construction devices include sweepers, cold planers, and rock saws. Collectively, land clearing and mobile construction devices are sometimes referred to herein as mobile attachment devices. These mobile attachment devices are typically attachments mounted to a prime mover such as a tractor, excavator, or skid steer loader. Most mobile attachment devices include protruding members such as blades, knives, picks, brushes, cutting tools, hammers, or teeth (collectively, "teeth") mounted on a shaft which rotates at a high rate of speed to create the force necessary to cut, crush, or sweep material contacting the teeth. In many mobile attachment devices the shaft is rotated by a hydraulic motor which may be powered by the prime mover.

During operation the teeth may encounter different types of material. Some material may be easier to cut and/or crush than other types of material. For example, in some cases the teeth may inadvertently encounter a rock or other solid object which significantly slows down the rotational movement of the shaft. The slowing and/or stopping of the teeth/shaft during operation may cause an impulse load on the hydraulic motor which can damage the motor.

Existing technologies have tried to prevent or minimize impulse loads from being transferred between the shaft and the motor. Some existing devices use belt drives or rubber isolation discs to help absorb these impulse loads to protect the hydraulic motor. The prior art rubber isolation discs comprise a two-piece flange/bearing housing that contains the rubber isolation disc. The rubber disc is combined with the mobile attachment housing by another retaining ring flange. Within the bearing housing are two angular contact bearings, or tapered roller bearings which require a pre-set preload during assembly. The bearing housing is capped with a flange to mount the hydraulic motor. The complexity of this prior art solution assembly leads to higher costs and poor serviceability. Additionally, the rubber isolation disc can deteriorate from exposure to ultraviolet light and time. The rubber isolation disc when absorbing an impact can deflect the rotor causing a reduction of working rotor speed.

There is therefore a need for an improved drive assembly for a hydraulically powered mobile attachment device which helps to minimize or prevent impulse loads from being transferred between the mobile attachment device and the motor.

SUMMARY

The invention relates to a drive system assembly for a mobile attachment device. The invention may be used on any suitable mobile attachment devices. Mobile attachment devices are typically attachments removably combined with prime mover vehicles, however, the devices may also be an integral part of the prime mover vehicle and need not be detachable therefrom.

The drive system assembly comprises a hydraulic motor which may be powered by the prime mover. The hydraulic motor provides rotational power to the mobile attachment device. The mobile attachment device generally comprises a shaft pivotally mounted to a housing. The shaft (rotor) has a plurality of teeth extending therefrom. The drive system assembly comprises a torsional coupling having a first portion and a second portion. In one embodiment the hydraulic motor is operatively combined with the first portion of the torsional coupling and the shaft of the mobile attachment device is operatively combined with the second portion of the torsional coupling so that the torsional coupling is operatively positioned between the hydraulic motor and the shaft of the mobile attachment device. In another embodiment the first portion of the torsional coupling is combined with the mobile attachment device housing and the second portion of the torsional coupling is combined with the hydraulic motor housing so that the torsional coupling is operatively positioned between the hydraulic motor and the housing of the mobile attachment device.

The torsional coupling is used to isolate unwanted torsion impulse loads transmitted from the drive shaft of the mobile attachment device to the hydraulic motor which are created during operation. The first portion of the torsional coupling is adapted to pivot or rotate relative to the second portion of the torsional coupling. The torsional coupling comprises springs between the first portion and the second portion which absorb force transmitted between the two portions. In operation the motor rotates the drive assembly. If the teeth of the mobile attachment device encounter material which causes the shaft to slow down or stop, the springs in the torsional coupling are compressed between the first portion and the second portion to help to isolate and protect the motor from the impulse load.

The assembly of the present invention reduces complexity relative to prior art drive assemblies which inherently leads to reduced component costs, reduced assembly time, reduced maintenance, increased durability, and improved serviceability. The motor-torsion disc sub-assembly greatly improves manufacturability and serviceability over prior art designs by allowing technicians to install and remove the sub-assembly as one unit. Another benefit of the assembly is the ability to tune the torsional stiffness to optimize the performance of the attachment. Since the torsion disc utilizes mechanical springs to absorb the impulse, they can be sized to minimize the impulse to the motor. Multiple spring rates can be selected and used in the same torsion disc to minimize the impulse, tune out unwanted harmonics, and accommodate different motor torque curves. Another benefit of the assembly is that metal components may be used throughout the drive system, which helps to prevent degradation over a reasonable product lifetime.

BRIEF DESCRIPTION OF THE DRAWINGS

A better understanding of the drive system assembly of the present invention may be had by reference to the following Detailed Description as illustrated by the following drawing figures wherein.

DETAILED DESCRIPTION

Figure 1:
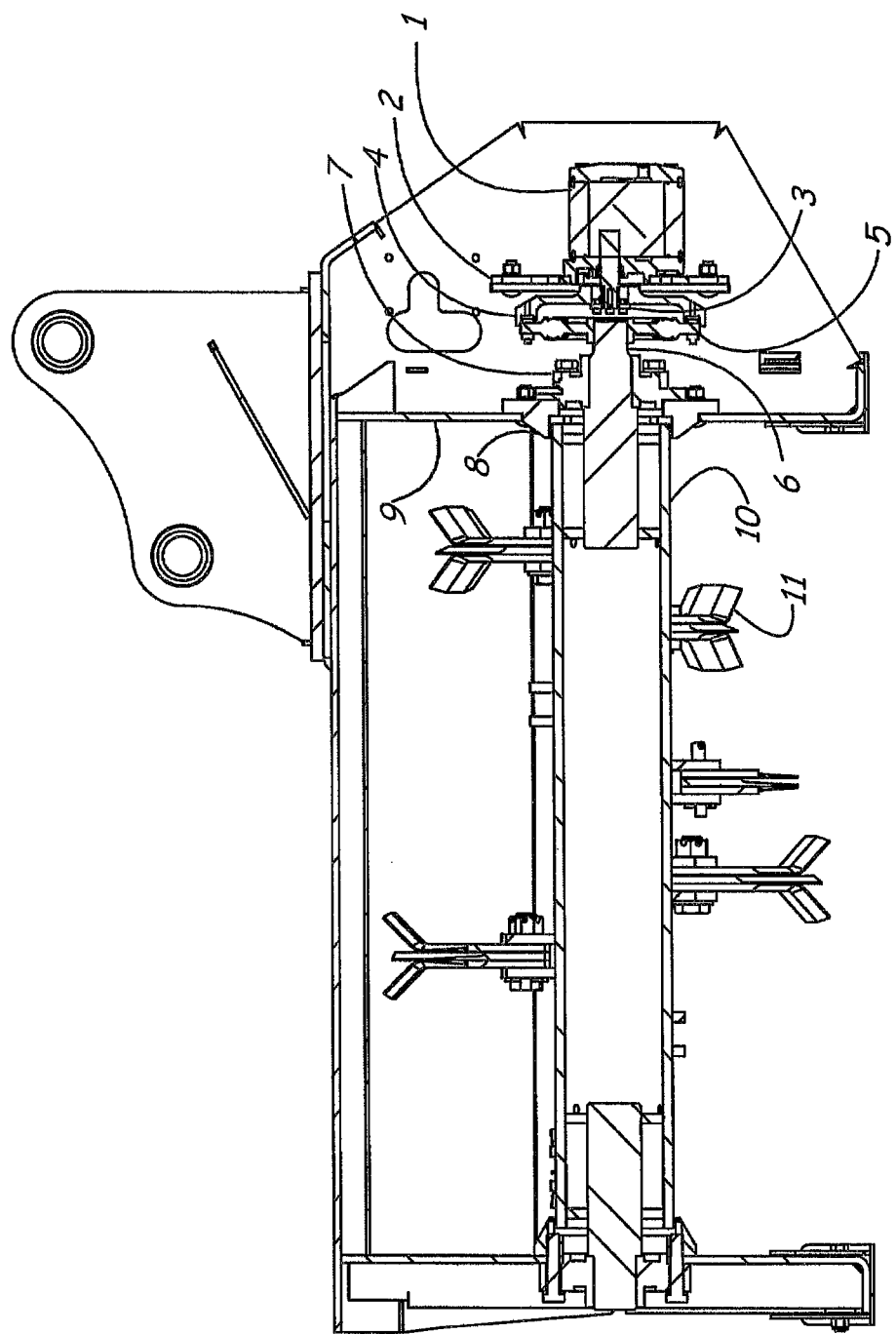
FIG. 1 is a plan section view of one embodiment of the drive assembly for use in a mobile attachment devices, shown here as a flail-type cutting mobile attachment device.
Figure 2:
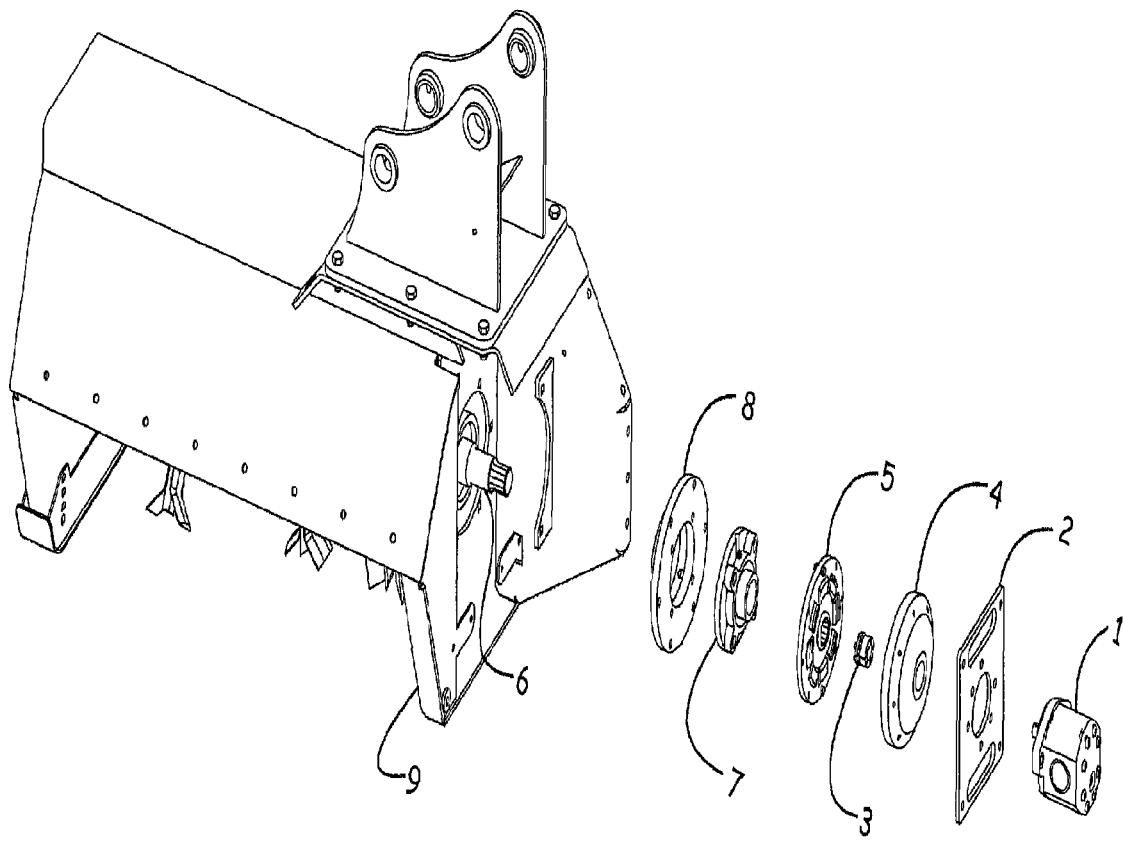
FIG. 2 is an isometric exploded view of the drive assembly shown in FIG. 1 wherein the torsional coupling is combined with the hydraulic motor and the shaft of the mobile attachment device.

The drive system assembly comprises a hydraulic motor 1 which may be powered by the prime mover. The hydraulic motor 1 provides rotational power to a mobile attachment device, which comprises a shaft 6 pivotally mounted to a housing 9. The shaft 6 has a plurality of teeth extending therefrom. FIGS. 1 and 2 show one embodiment of the invention wherein the drive assembly includes a hydraulic motor 1 combined with a plate 2 which helps to secure the motor 1. The motor 1 transmits torque to the adapter disc 4 through a keyless bushing 3. The adapter disc 4 is combined with a first portion 22 of the torsional coupling 5. The drive shaft of the rotor 6 is combined with a second portion 20 of the torsional coupling 5. In other embodiments the adapter disc 4 may be combined with the second portion 20 of the torsional coupling 5 and the rotor 6 maybe combined with the first portion 22 of the torsional coupling 5. In still other embodiments the output shaft of the motor 1 may be combined directly with the torsional coupling 5 without any intermediate components as shown in FIGS. 5-8 and described below. In still other embodiments the second portion 20 of the torsion disk 5 is combined with the flange of the motor 1 housing and the first portion 22 of the torsion disk 5 is combined with the mobile attachment device housing 9 as shown in FIG. 9 and described below. Regardless of the configuration of components, the torsional coupling 5 is positioned between the motor 1 and the mobile attachment device to help absorb torsion impulse loads created during operation of the attachment.

In the embodiment shown in FIGS. 1 and 2, the drive shaft 6 is supported by a flanged bearing 7, which is fixedly connected to a bearing support plate 8, if required, which in turn is combined with the housing 9. The rotor tube 10 is combined with the shaft 6. The rotor tube 10 is combined with the teeth 11 in some embodiments. As the work material to be cut is introduced to the teeth 11, a torsional impulse is transmitted into the rotor tube 10 which in turn transmits the impulse to the shaft 6 and the rest of the drive train assembly. The torsional coupling 5 is a barrier to these impulse loads and can help absorb the impulse and prevent it causing harm to the hydraulic motor 1.

FIG. 2 is an exploded view of one of the preferred embodiments, further showing the general assembly. It can be seen that the serviceability is improved over the prior art in that the hydraulic motor 1, mounting plate 2, keyless bushing 3, adapter hub 4, and torsional coupling 5 can be removed from the housing 9 as one complete unit (referred to as the motor-torsional coupling sub-assembly). This allows the torsional coupling 5 or the hydraulic motor 1 to be serviced without having to remove the assembly's other components individually. Similarly, the flange bearing 7 can be serviced without breaking down the motor-torsional coupling sub-assembly.

Figure 3:
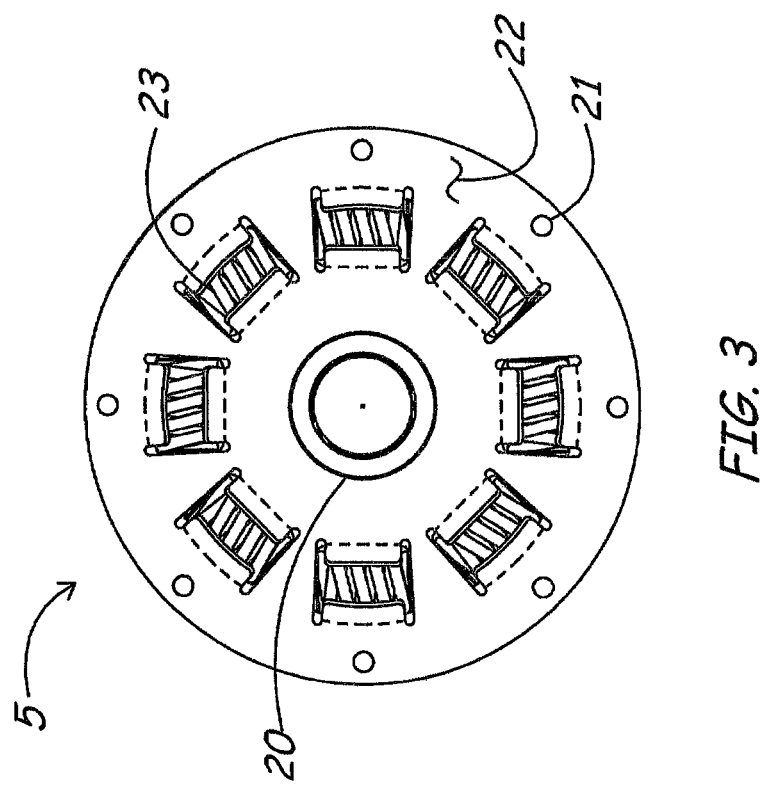
FIG. 3 is a plan view of one embodiment of the torsional coupling.
Figure 4:
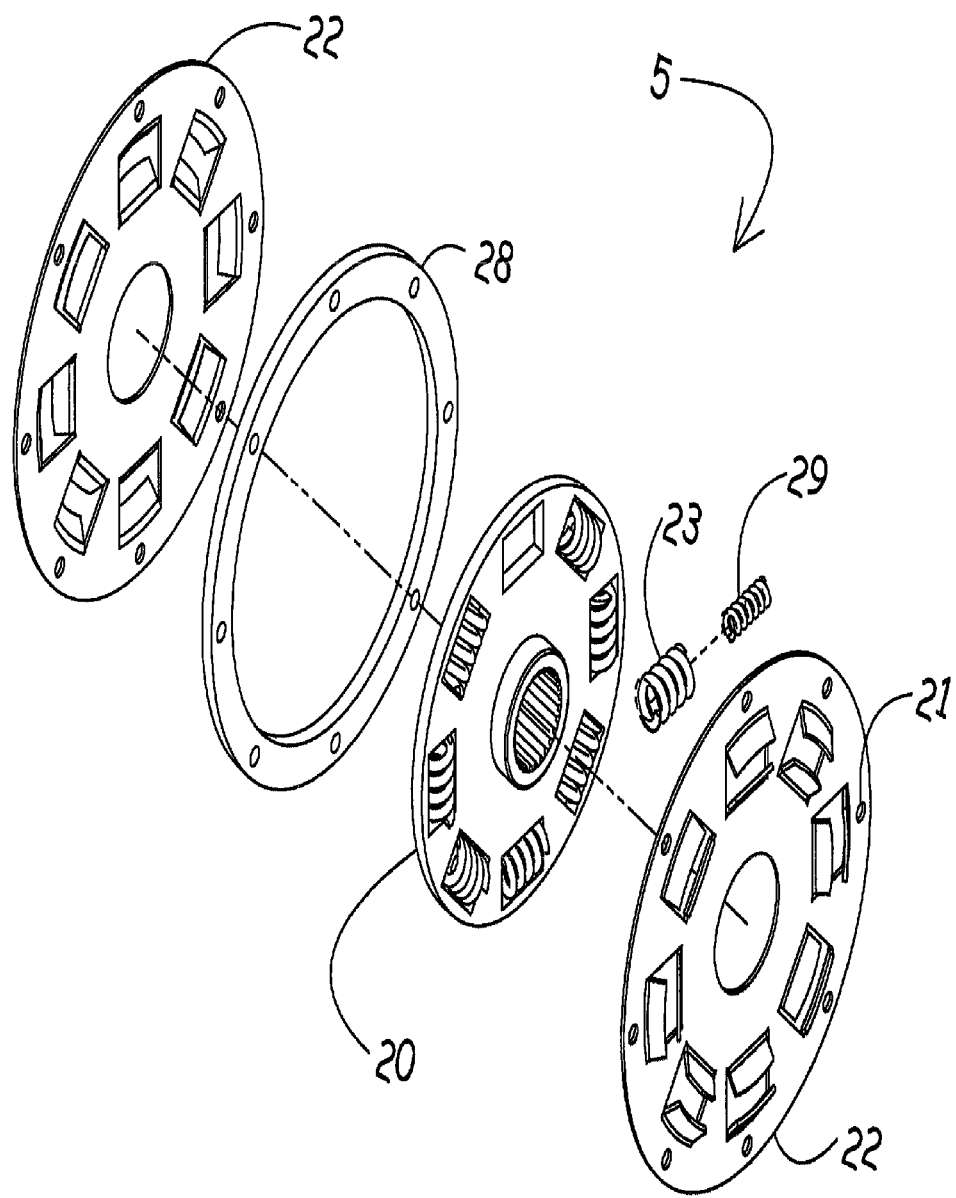
FIG. 4 is an isometric exploded view of the torsional coupling shown in FIG. 3.

FIGS. 3 and 4 show one embodiment of the torsional coupling 5. The torsional coupling 5 may be similar in function and operation to the devices disclosed in U.S. Pat. No. 6,113,496, 6,837,345, 5,163,875, or 4,553,855, which are hereby incorporated by this reference. As shown in FIGS. 3 and 4, the torsional coupling 5 includes a first portion 22 which may be an outer plate and a second portion 20 which may be a splined hub. The outer plate (first portion 22) may be two side plates mounted on either side of the second portion 20 as shown in FIG. 4. A retainer member 28 may be positioned between the two outer plates 22 thereby providing the space necessary for the second portion 20 to rotate between the outer plates 22. The retainer member 28 may be fixedly combined with the outer plates 22 using bolts or other suitable connectors.

In one embodiment, the first portion 22 is operatively combined with either the hydraulic motor 1 or the shaft 6 on a first side of the torsional coupling 5. The second portion 20 is operatively combined with the other of the hydraulic motor 1 or the shaft 6 on a second side of the torsional coupling 5. In one embodiment the first portion 22 is combined to the motor 1 through the adapter plate 4 by combining the first portion 22 to the adapter plate 4 securing bolts or other suitable fasteners through openings 21. The second portion 20 of the torsional coupling 5 is operatively combined with the drive shaft 6 of the mobile attachment device on a second side of the torsional coupling 5. The first portion 22 and second portion 20 are adapted to rotate relative to each other about a central axis. The relative rotation, however, is limited by the distance the springs 23 are allowed to compress. In most cases the first portion 22 only rotates a fraction of one rotation relative to the second portion 20.

Springs 23 are position between the first portion 22 of the torsional coupling 5 and the second portion 20 of the torsional coupling 5 to provide a vibration dampening effect between the two portions 22, 20. The springs 23 are adapted to contact both portions 22, 20 of the torsional coupling. The springs 23 are positioned within spring member receiving area in the first portion 22 and second portion 20. Each spring member receiving area has an end wall adapted to receive the compressive force of a spring 23. The length of the spring member receiving areas along with the spring rate of the springs 23 dictates how far the first portion 22 can rotate relative to the second portion 20.

The vibration dampening effect occurs as the springs 23 compress between the end walls of the spring member receiving areas as the torque is transmitted between the first portion 22 to the second portion 20. In one embodiment, the drive torque is transmitted from the motor 1 to the first portion 22 of the torsional coupling 5 then through a series of springs 23 and finally to the second portion 20 of the torsional coupling 5 which transmits torque to the drive shaft 6. After the motor 1 has accelerated the shaft 6 to its operational speed, if the drive shaft 6 experiences an unexpected shock load which slows the rotation of the shaft 6, then the shaft 20 correspondingly causes the second portion 20 of the torsional coupling 5 to slow down since the two components are fixedly combined. The motor 1, however, continues to provide torque to the first portion 22 of the torsional coupling 5. The springs 23 compress between the end walls of the first portion 22 and the second portion 20 thereby helping to absorb the shock load which may otherwise be transmitted to the hydraulic motor 1.

The springs 23 may be made from any conventional spring material having appropriate modulus of elasticity. For example, the springs 23 may be metal or rubber/polymer coil springs, tension springs, or compression springs. Different cutting tools, machine sizes, and applications may require different torsional stiffness in order to protect the hydraulic motor 1. The torsional stiffness can be adjusted by changing the spring rate of each spring 23 or using springs 23 having different spring rates. In one embodiment springs 23 having a first spring rate may be used in conjunction with other springs 23 having a second spring rate. In some embodiments, an inner spring 29 and outer spring 23 can be used to adjust the torsional stiffness of the spring coupling wherein the inner spring 29 works in conjunction with the outer spring 23 and may be placed inside the outer spring 23 as shown in FIG. 4. In this embodiment the inner spring 29 typically has a different spring rate than the outer spring 23.

As mentioned above, the torsional coupling of the present invention may be used with any suitable land clearing or mobile construction device. FIGS. 5-8 show the invention used with exemplary land clearing and mobile construction devices. These figures also show embodiments wherein the motor 1 is combined with the first 22 or second 20 portion of the torsional coupling 5 and the shaft 6 is combined with the other of the first 22 or second 20 portion of the torsional coupling 5. These figures show an embodiment wherein the torsional coupling 5 is positioned between the motor 1 and the shaft 6 without the other assembly components shown in FIG. 2. It should be noted, however, that any embodiment of the invention may be used with the mobile attachment devices shown in FIGS. 5-8.

Figure 5:
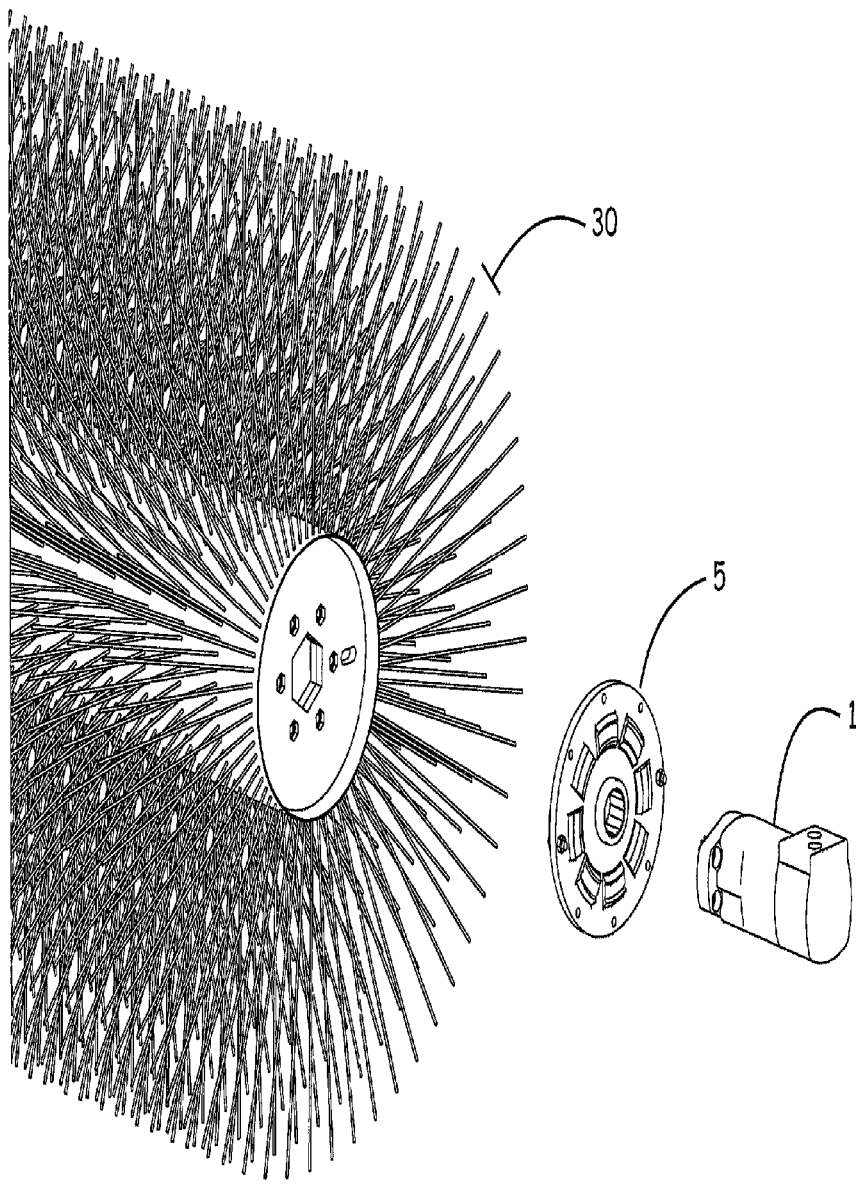
FIG. 5 is an isometric exploded view of the torsional coupling in a sweeper application.

As shown in FIG. 5, the torsional coupling 5 is implemented in a sweeper application. The broom core 30 rotates about its cylindrical axis in a direction opposite to the forward motion of the work tool. The teeth (bristles) in the broom core 30 sweep unwanted material from the work surface. In the sweeping application, the broom core 30 is frequently raised from the sweeping surface then subsequently the hydraulic flow to the motor 1 is terminated. The rotational inertia of the broom core 30 causes a shock load to be transmitted to the hydraulic motor 1. The torsional coupling 5 is used to absorb the unwanted torsional shock loads.

Figure 6:
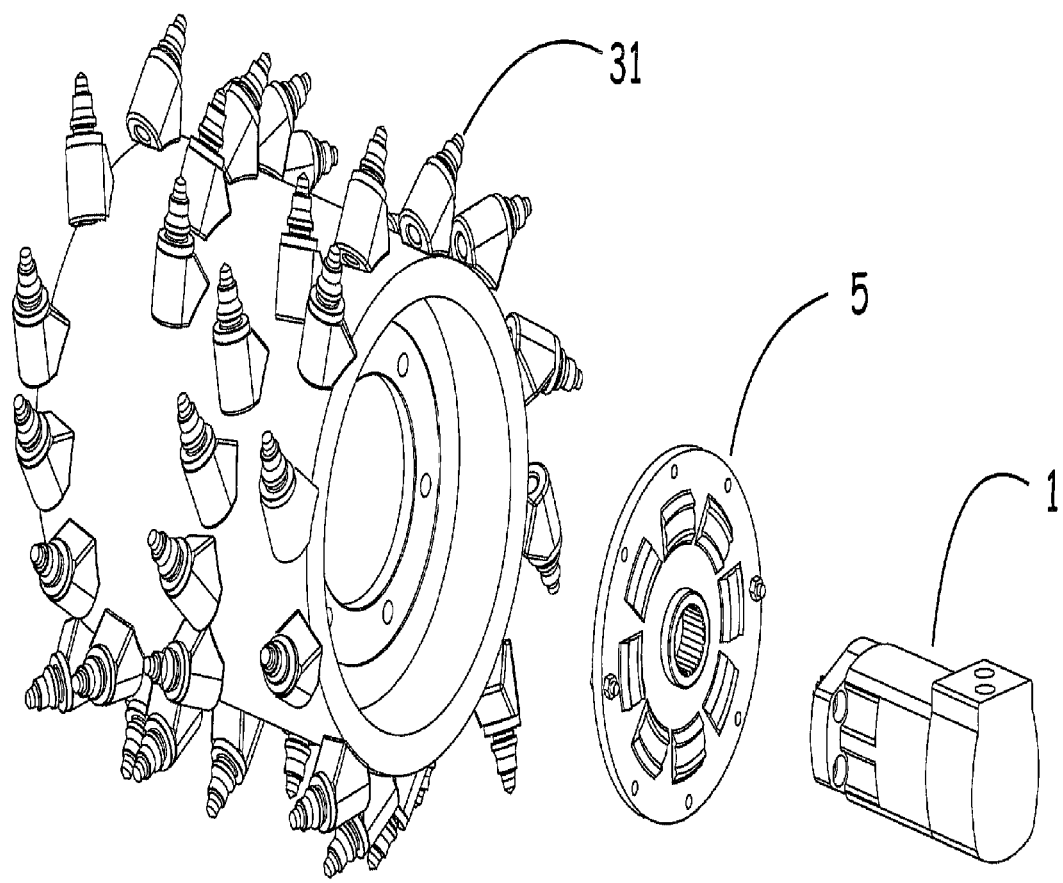
FIG. 6 is an isometric exploded view of the torsional coupling in a cold planning application.

Another work tool application for the torsional coupling 5 is a cold planer application as shown in FIG. 6. The cold planning drum 31 rotates about its cylindrical axis in a direction opposite to the forward motion of the work tool. The teeth (picks) are driven into the work material, typically asphalt or concrete, and break-up the material so it can be removed and replaced. In the cold planning application, the picks continually strike hard material. This intermittent striking of the picks produces a shock load that is transmitted to the hydraulic motor 1. The torsional coupling 5 is used to absorb the unwanted torsional shock load.

Figure 7:
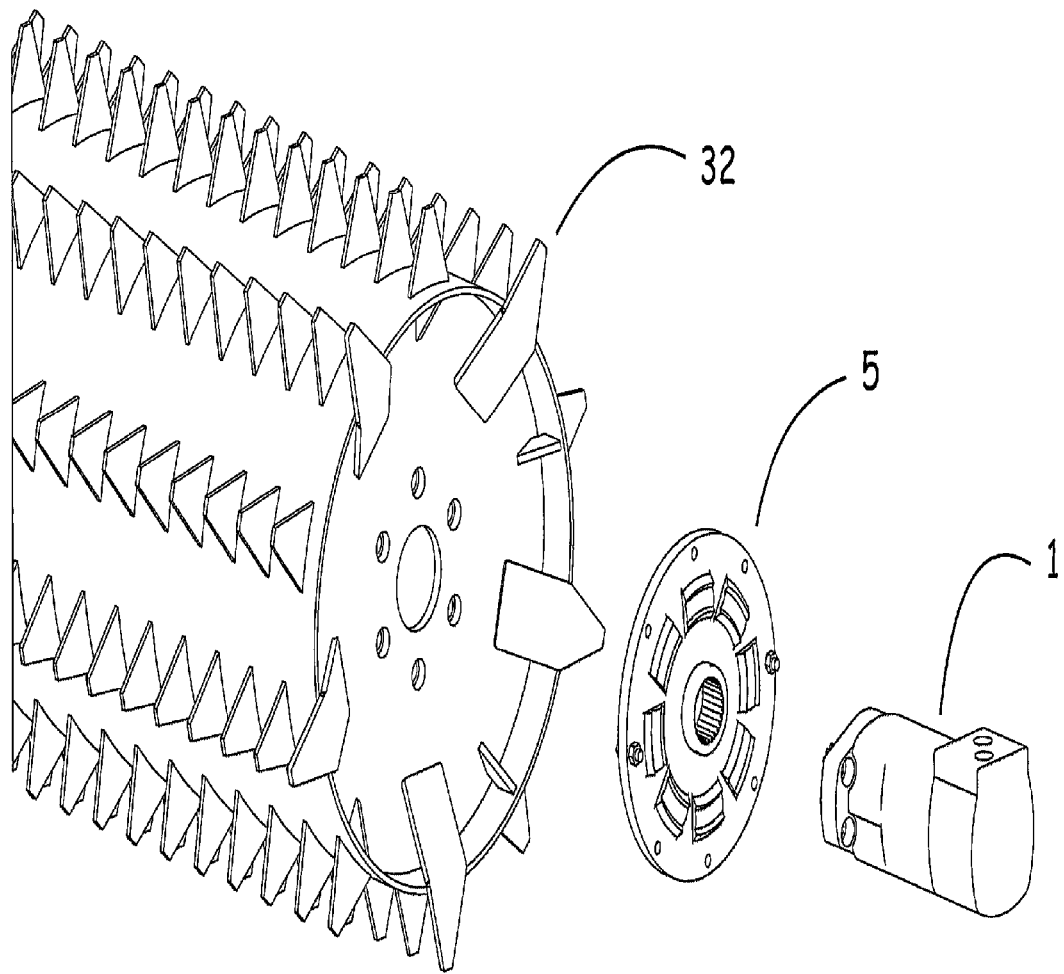
FIG. 7 is an isometric exploded view of the torsional coupling in a soil conditioning application.
Figure 8:
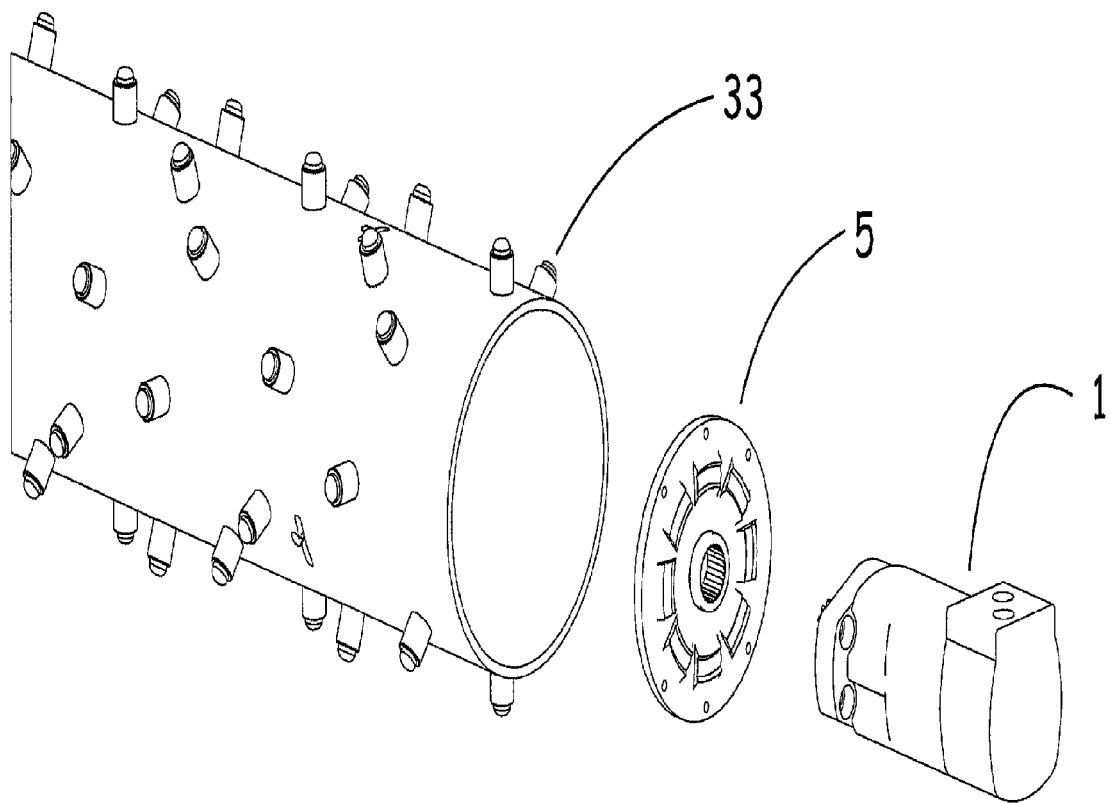
FIG. 8 is an isometric exploded view of the torsional coupling in another soil conditioning application.
Figure 9:
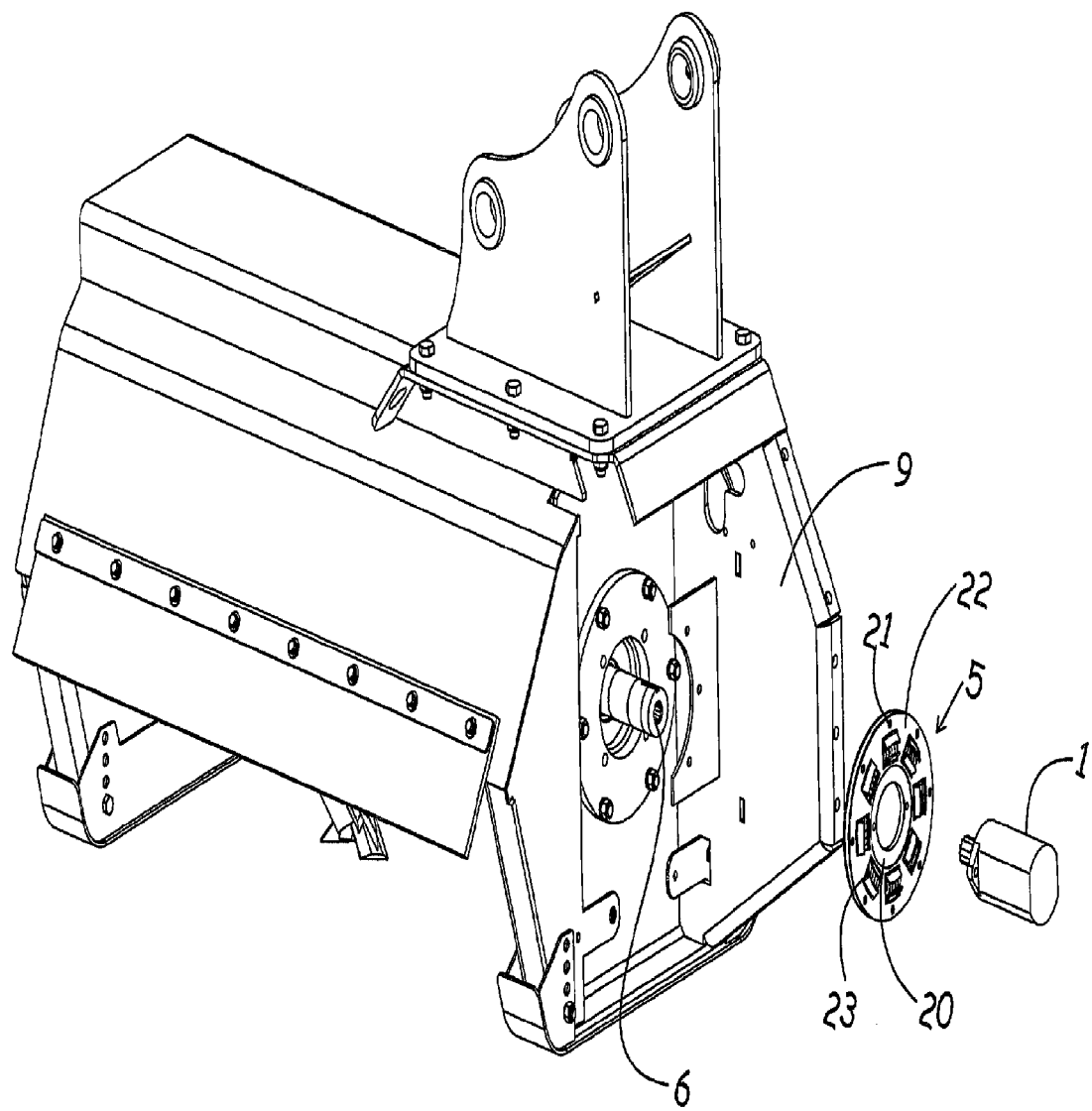
FIG. 9 is an isometric exploded view of an alternate embodiment wherein the torsional coupling is combined with the hydraulic motor and the housing of the mobile attachment device.

Further applications include soil conditioners as shown in FIGS. 7 and 8. The soil conditioning drums 32 and 33 rotate about their cylindrical axis in a direction opposite to the forward motion of the work tool. The teeth are driven into the work material, typically soil, and break up the soil in preparation for grass seeding. The teeth occasionally strike rocks or other imbedded objects beneath the soil. This intermittent striking of rocks produces a shock load that is transmitted to the hydraulic motor 1. The torsional coupling 5 is used to absorb the unwanted torsional shock load.

FIG. 9 shows an alternate embodiment wherein the drive shaft of the motor 1 is combined with the shaft 6 of the mobile attachment device. The torsion disk 5 is positioned between the motor 1 and the shaft 6. In the embodiment shown the torsion disk 5 comprises an opening adapted to allow the drive shaft of the motor 1 and the shaft 6 to combine with each other. The second portion 20 of the torsion disk 5 is combined with a portion of the motor 1 and the first portion 22 of the torsion disk 5 is combined with the mobile attachment device housing 9. In alternate embodiments the combination of components is reversed. In operation the motor 1 rotates the rotor 6 to perform its work function. If the shaft 6 creates a torsional shock load causing the drive shaft of the motor 1 to slow or stop, then the entire motor 1 body pivots with the second portion 20 of the torsion disk 5 relative to the first portion 20 of the torsion disk 5 as springs 23 absorb the impulse load.

Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included with in the scope of the following claims.

What is claimed is as follows:

1. A drive assembly comprising:
 a hydraulic motor;
 a torsional coupling having a first portion which rotates relative to a second portion about an axis, wherein the first portion is operatively combined with a mobile attachment device and the second portion is operatively combined with the hydraulic motor for rotating the mobile attachment device in consecutive revolutions in a forward direction;
 wherein the first portion includes two side plates secured to and separated by a retainer member having a first diameter and the second portion includes an inner plate positioned between the two side plates, wherein the inner plate has a second diameter that is smaller than the first diameter so that the inner plate rotates inside the retainer member;
 a spring positioned between the first portion and the second portion to help absorb torsion impulse loads between the first portion and the second portion created during operation of the device.

2. The drive assembly of claim 1 wherein the mobile attachment device comprises a shaft which rotates inside a housing and the first portion is combined with the housing.

3. The drive assembly of claim 1 wherein the mobile attachment device comprises a shaft which rotates inside a housing and the first portion is combined with the shaft.

4. A drive assembly for a mobile attachment device, said assembly comprising:
 a shaft pivotally mounted to a housing;
 a hydraulic motor having an output shaft;
 a torsional coupling having a first portion which rotates relative to a second portion about an axis, wherein the first portion is operatively combined with the hydraulic motor and the second portion is operatively combined with the shaft, wherein the first portion includes two side plates secured to and separated by a retainer member having a first diameter and the second portion includes an inner plate positioned between the two side plates, wherein the inner plate has a second diameter that is smaller than the first diameter so that the inner plate rotates inside the retainer member;
 an adapter disc secured between the output shaft of the hydraulic motor and the first portion of the torsional coupling, said adapter disk for transferring torque from the hydraulic motor to the first portion of the torsional coupling;
 a spring positioned between the first portion and the second portion to help absorb torsion impulse loads between the first portion and the second portion created during operation of the device.

5. The assembly of claim 4 wherein the spring is comprised of an elastomeric material.

6. The assembly of claim 4 wherein a plurality of springs are positioned between the first and second portions of the torsional coupling, said plurality of springs including at least a first spring and a second spring.

7. The assembly of claim 6 wherein the first spring has a different spring rate than the second spring.

8. The assembly of claim 6 wherein the first spring is nested inside the second spring, and the first spring has a different spring rate than the second spring.

9. The assembly of claim 4 wherein the hydraulic motor, keyless bushing, adapter disc, and torsional coupling can be removed from the housing together as one unit.

10. A drive assembly for a mobile attachment device, said assembly comprising:
   a shaft pivotally mounted to a housing;
   a plurality of teeth combined with the shaft;
   a hydraulic motor having an output shaft;
   an adapter disc secured between the output shaft of the hydraulic motor and a keyless bushing, said adapter disk for transferring torque from the hydraulic motor to the keyless bushing;
   a torsional coupling having a first portion which rotates relative to a second portion, wherein the first portion is operatively combined with the keyless bushing and the second portion is operatively combined with the shaft, wherein the first portion includes two side plates secured to and separated by a retainer member having a first diameter and the second portion includes an inner plate positioned between the two side plates, wherein the inner plate has a second diameter that is smaller than the first diameter so that the inner plate rotates inside the retainer member;
   a spring between the first portion of the torsional coupling and the second portion of the torsional coupling to help absorb torsion impulse loads created during operation of the device.

11. A drive assembly comprising:
   a plurality of teeth combined with a shaft;
   a hydraulic motor for rotating the shaft;
   a torsional coupling having a first portion which rotates relative to a second portion, wherein the first portion is operatively combined with a mobile attachment device and the second portion is operatively combined with the hydraulic motor, wherein the first portion and the second portion each include a spring member receiving area, wherein the first portion includes two side plates secured to and separated by a retainer member having a first diameter and the second portion includes an inner plate positioned between the two side plates, wherein the inner plate has a second diameter that is smaller than the first diameter so that the inner plate rotates inside the retainer member;
   a spring positioned within the spring member receiving area of the first and second portion, said spring member receiving area is positioned between the first portion of the torsional coupling and the second portion of the torsional coupling to help absorb torsion impulse loads created during operation of the device.

12. The drive assembly of claim 11 wherein the first portion is combined with a housing of the mobile attachment device.

13. The drive assembly of claim 11 wherein the first portion is combined with the shaft of the mobile attachment device.

* * * * *